Feb. 7, 1939.  E. W. KEIER  2,146,373
APPARATUS FOR CUTTING GLASS SHEETS
Filed Nov. 27, 1935  2 Sheets-Sheet 1

Inventor
EDWIN W. KEIER.

By Frank Fraser
Attorney

Feb. 7, 1939.   E. W. KEIER   2,146,373
APPARATUS FOR CUTTING GLASS SHEETS
Filed Nov. 27, 1935   2 Sheets-Sheet 2

Inventor
EDWIN W. KEIER.
By Frank Fraser
Attorney

Patented Feb. 7, 1939

2,146,373

UNITED STATES PATENT OFFICE 2,146,373

APPARATUS FOR CUTTING GLASS SHEETS

Edwin W. Keier, Toledo, Ohio, assignor to Libbey-Owens-Ford Glass Company, Toledo, Ohio, a corporation of Ohio Application November 27, 1935, Serial No. 51,757

9 Claims. (Cl. 49—50)

The present invention relates broadly to the cutting of glass and more particularly to apparatus for cutting flat sheets or plates of glass or similar materials.

It is the aim of this invention to provide apparatus by the practice and use of which irregular or special shapes or forms of various sizes and/or contours may be cut from glass sheets or plates in a rapid, convenient and economical manner.

According to the invention, the severing of the glass sheet or plate is effected by alternate heating and cooling thereof along a defined line of cleavage so that the necessity of mechanically scoring the said sheet or plate with a diamond or other scoring tool is obviated. Briefly, the glass sheet to be cut is first heated along the desired line of cleavage by bringing one surface thereof into engagement with an electrically heated element having a contour corresponding to that of the form or section to be cut from the sheet. After the sheet has been sufficiently heated, the glass is suddenly chilled in such a manner as to cause the said sheet to automatically break or crack along the heated line of cleavage. The chilling of the glass is preferably effected by bringing the opposite surface of the sheet into engagement with a cooling element also having a contour corresponding to that of the section to be cut from the sheet and which acts to chill the glass along a line coinciding with the heated line of cleavage. This successive heating and cooling of opposite surfaces of the glass sheet along coinciding lines sets up a temperature differential between opposite surfaces of the sheet which causes the said sheet to automatically fracture along said lines. If desired, the breaking operation may be aided by flexing the glass in the customary manner during the chilling operation.

Other objects and advantages of the invention will become more apparent during the course of the following description when taken in connection with the accompanying drawings.

In the drawings wherein like numerals are employed to designate like parts throughout the same, Fig. 1 is a plan view of cutting apparatus constructed in accordance with the present invention;

Figure 1:
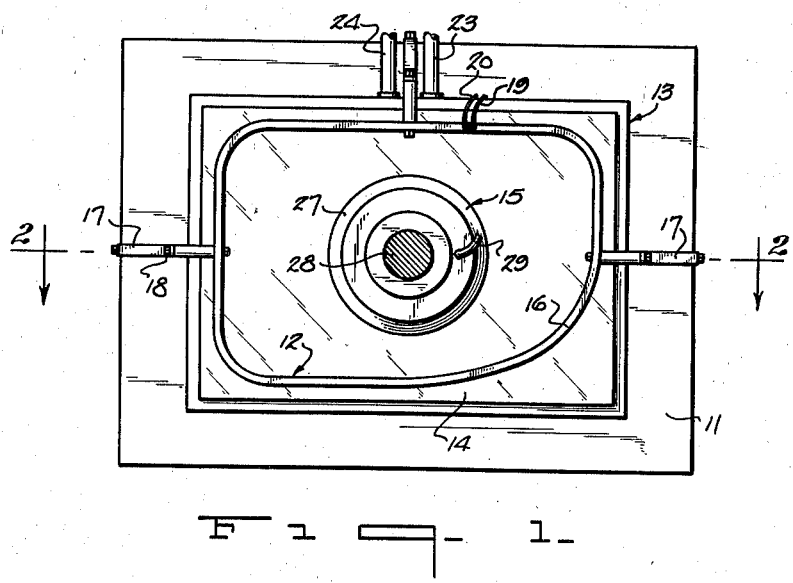
Figure 2:
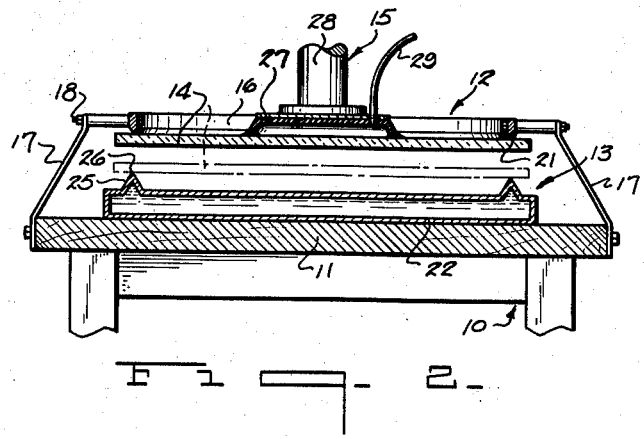
Fig. 2 is a longitudinal vertical sectional view taken substantially on line 2—2 of Fig. 1.

In the embodiment of the invention illustrated in Figs. 1 and 2, there is provided an apparatus including a table 10 having a flat stationary top 11 and upon which is mounted the superimposed heating means 12 and cooling means 13 between which the glass sheet 14 to be cut is adapted to be received and supported by the supporting means 15.

The heating means 12 comprises an electrically heated element in the form of a metallic resistance strip 16 bent to form a substantially closed loop having a contour corresponding to that of the sheet section to be cut. The electrically heated element 16 is supported above the top of the table 10 in any suitable manner such as by means of a plurality of brackets 17 and bolts 18. The heating element may be connected by the lead wires 19 and 20 to a suitable source of electrical energy. The lower portions of the opposite side faces of the electrically heated element also taper to a relatively sharp edge indicated at 21 so that the said element has substantially line contact with the glass sheet.

The cooling means 13 comprises a substantially rectangular metal casing 22 supported upon the top 11 of table 10 and provided with inlet and outlet pipes 23 and 24 whereby a suitable cooling medium such as water may be continuously circulated through said casing. The top wall of the casing is provided with a raised portion 25 having upwardly converging sides terminating in a relatively sharp edge 26 positioned directly beneath the edge 21 of the heating element and coinciding therewith. In other words, the heating element 16 and the raised portion 25 of the cooling means are of the same contour so that they engage the glass sheet at directly opposite points.

The supporting means 15 for the glass sheet may be of any preferred construction but is here shown as comprising a vacuum cup or sucker 27 carried at the lower end of a vertical plunger 28 and adapted to engage the upper surface of the sheet 14. After the suction cup has been moved to engage the glass sheet, the air is adapted to be exhausted therefrom through a pipe 29 connected with suitable exhausting and control apparatus.

Figure 3:
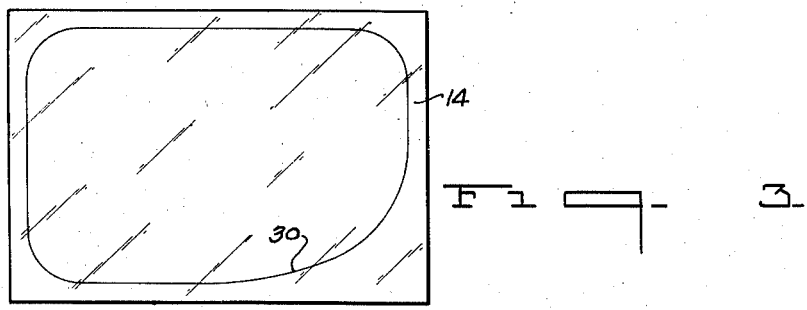
Fig. 3 is a view showing a sheet of glass with the line of cleavage indicated thereon.

In carrying out the invention, the glass sheet 14 to be cut is first positioned horizontally between the heating and cooling means 12 and 13 respectively and attached to the suction cup 27. The sheet is then moved upwardly by the supporting means 15 until it engages the lower edge 21 of the heating element 16, as shown by the full lines in Fig. 2, whereupon a supply of current is passed through the said element sufficient to effect the desired heating of the glass along a continuous closed line of cleavage corresponding to the contour of the heating element as indicated at 30 in Fig. 3. When the glass sheet has been heated to the desired temperature, the said sheet is lowered to bring the bottom surface thereof into engagement with the upper edge 26 of the raised portion 25 of the cooling means, as shown by the broken lines in Fig. 2. The cooling means acts to suddenly chill the bottom surface of the sheet along a line coinciding with the heated line of cleavage, and this sudden chilling of the glass sets up a differential in temperature between opposite surfaces of the sheet which results in the automatic cracking thereof along the heated line of cleavage. Since both the heating element and cooling means have substantially line contact with the glass sheet, the heating and subsequent chilling thereof will be concentrated along a relatively very narrow path or zone which will greatly facilitate the automatic breaking of the glass. As pointed out above, the glass sheet can be flexed during the chilling thereof if desired to assist in the breaking operation. This may be found particularly desirable in the cutting of relatively thick sheets.

Figure 4:
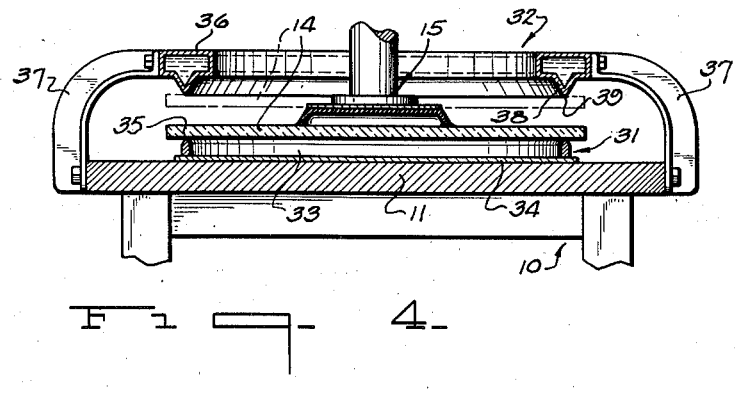
Fig. 4 is a vertical longitudinal sectional view through another form of cutting apparatus embodying the invention.

The form of apparatus illustrated in Fig. 4 is substantially the same as that described hereinabove, the principal difference being that in this case the heating means, designated in its entirety by the numeral 31, is beneath the cooling means 32. The heating means 31 comprises an electrically heated element 33 carried upon the top of table 10 and supported upon a sheet or pad 34 of suitable insulating material. The heating element also comprises a metallic resistance wire having the desired contour and suitably connected with a source of electrical energy. The upper portion of the metal strip tapers to a relatively sharp edge 35, with the result that the said heating element has substantially line contact with the glass sheet along the path of cleavage.

The cooling means 32 comprises a ring 36 in the form of a substantially rectangular hollow casing through which a suitable cooling medium such as water is adapted to be circulated, said ring being supported by brackets 37 carried by the top of the table. The bottom wall of the cooling ring is formed with a depending portion 38 having tapered sides which terminate in a relatively sharp edge 39 positioned directly above and having the same contour as the edge 35 of heating element 33, so that the said heating element and cooling ring engage opposite surfaces of the glass sheet along coinciding lines.

In practice, the glass sheet 14 is positioned between the heating and cooling means 31 and 32 respectively and attached to the supporting means 15. The sheet is first lowered into contact with the heating element 33 and after being sufficiently heated along the path of cleavage is lifted upwardly into contact with the cooling ring 36 which acts to suddenly chill the said sheet along a line coinciding with the heated line of cleavage to effect the automatic breaking thereof.

Figure 5:
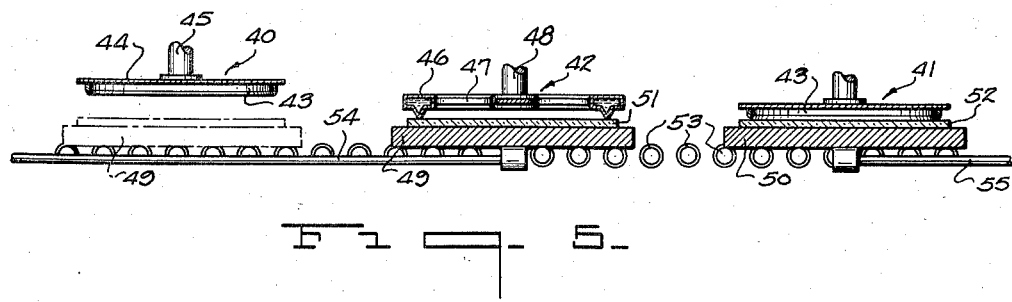
Fig. 5 is a diagrammatic vertical longitudinal sectional view showing an arrangement including two heating units and a single cooling unit.

Ordinarily, the heating of the glass will consume a relatively longer period of time than the cooling or chilling operation, as a result of which two heating units may be used in conjunction with a single cooling unit as illustrated in Fig. 5 wherein the two heating units are designated 40 and 41 and the single cooling unit 42. In the arrangement shown, the heating and cooling units are positioned in alignment with one another with the cooling unit disposed between the heating units.

Each heating unit 40 and 41 comprises an electrically heated element 43 of the type shown in Figs. 1 and 2 carried upon the underside of a plate 44 secured to the lower end of a plunger 45. The cooling unit 42 consists of a hollow ring 46 of the type shown in Fig. 4 and carried by a plurality of horizontal arms 47 radiating from the plunger 48. The numerals 49 and 50 designate two movable tables carrying glass sheets 51 and 52 respectively to be cut. Arranged beneath the heating and cooling units is a horizontal runway consisting of a plurality of horizontally aligned rolls 53 upon which the tables 49 and 50 are movably supported, the table 49 being reciprocated by means of a rod 54 while the table 50 is reciprocated by means of a rod 55.

With the above arrangement, while one sheet is being heated, the other sheet is being cooled. For instance, as shown in Fig. 5, the glass sheet 51 having been heated is undergoing the cooling operation while the sheet 52 is being heated by the heating unit 41. After the glass sheet 51 has been chilled to effect the breaking thereof, the cooling unit is lifted from the sheet, the table 49 moved to the left, the cut sheet removed, and another sheet to be cut placed thereupon and the heating unit 40 lowered into contact therewith. By this time, the sheet 52 on table 50 will have been sufficiently heated whereupon the heating unit 41 is lifted therefrom and the said table moved to the left along the runway to bring the glass sheet beneath the cooling unit 42, which is then lowered upon the glass to effect the sudden chilling and breaking thereof. The above cycle of operations is then repeated and in this way a large number of glass sheets can be cut to a predetermined accurate size rapidly, conveniently, and economically.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. An apparatus for cutting glass sheets, including means for successively heating and cooling the glass sheets along a substantially continuous closed line of cleavage, and means for supporting the sheet during the heating and cooling thereof.

2. An apparatus for cutting glass sheets, including separate means for successively heating and cooling the glass sheet along a desired line of cleavage, and means for supporting the sheet and moving it alternately into engagement with said heating and cooling means.

3. An apparatus for cutting glass sheets, including an electrically heated element arranged to form a substantially closed loop having a contour corresponding to the contour of the section to be cut from the glass sheet and also adapted to have substantially line contact with said sheet along the desired line of cleavage, a cooling element also adapted to have substantially line contact with the sheet along the line of cleavage, and means for supporting the sheet and moving it alternately into engagement with said heating and cooling elements.

4. An apparatus for cutting glass sheets, including spaced superimposed heating and cooling means adapted to receive the glass sheet therebetween and acting to heat and cool opposite surfaces of the sheet respectively along coinciding lines, and means for supporting the sheet and moving it alternately into engagement with said heating and cooling means.

5. An apparatus for cutting glass sheets, including spaced superimposed heating and cooling elements adapted to receive the glass sheet therebetween and acting to heat and cool opposite surfaces of the sheet respectively along coinciding lines, means for supporting the sheet and moving it alternately into engagement with the heating and cooling elements, and means for electrically heating said heating elements.

6. An apparatus for cutting glass sheets, including spaced superimposed heating and cooling elements having a contour corresponding to the contour of the section to be cut from the glass sheet, means for supporting the sheet between said heating and cooling elements and for moving it alternately into engagement therewith to heat and cool opposite surfaces of the sheet respectively along coinciding lines, means for electrically heating said heating element, and means for cooling said cooling element.

7. An apparatus for cutting glass sheets, including spaced superimposed heating and cooling elements adapted to receive the glass sheet therebetween and acting to heat and cool opposite surfaces of the sheet respectively, said heating and cooling elements being arranged to form substantially closed loops having a contour corresponding to the section to be cut from the glass sheet, and means for supporting the sheet and moving it alternately into engagement with said heating and cooling elements.

8. An apparatus for cutting glass sheets, including spaced superimposed heating and cooling elements adapted to receive the glass sheet therebetween and acting to heat and cool opposite surfaces of the sheet respectively, said heating and cooling elements being in the form of substantially closed loops having a contour corresponding to the section to be cut from the glass sheet and also having substantially line contact therewith along the line of cleavage, means for electrically heating the heating element, means for cooling the cooling element, and means for supporting the glass sheet and moving it alternately into engagement with said heating and cooling elements.

9. An apparatus for cutting glass sheets including spaced superimposed heating and cooling means adapted to receive the glass sheet therebetween and acting to heat and cool opposite surfaces of the sheet respectively along coinciding lines, and means for effecting relative movement between said heating and cooling means and sheet to cause said sheet to alternately engage the said heating and cooling means.

EDWIN W. KEIER.